United States Patent
El-Hoiydi

(10) Patent No.: US 9,668,070 B2
(45) Date of Patent: May 30, 2017

(54) WIRELESS SOUND TRANSMISSION SYSTEM AND METHOD

(71) Applicant: SONOVA AG, Stäfa (CH)

(72) Inventor: Amre El-Hoiydi, Neuchâtel (CH)

(73) Assignee: Sonova AG, Staefa (CH)

(*) Notice: Subject to any disclaimer, the term of this patent is extended or adjusted under 35 U.S.C. 154(b) by 0 days.

(21) Appl. No.: 14/897,045

(22) PCT Filed: Jun. 10, 2013

(86) PCT No.: PCT/EP2013/061919
§ 371 (c)(1),
(2) Date: Dec. 9, 2015

(87) PCT Pub. No.: WO2014/198289
PCT Pub. Date: Dec. 18, 2014

(65) Prior Publication Data
US 2016/0134979 A1    May 12, 2016

(51) Int. Cl.
| | |
|---|---|
| H04B 1/715 | (2011.01) |
| H04R 25/00 | (2006.01) |
| H04L 1/20 | (2006.01) |
| G09B 21/00 | (2006.01) |
| H04W 72/02 | (2009.01) |

(52) U.S. Cl.
CPC ........... H04R 25/554 (2013.01); H04B 1/715 (2013.01); H04L 1/20 (2013.01); G09B 21/009 (2013.01); H04W 72/02 (2013.01)

(58) Field of Classification Search
CPC ......... H04R 25/554; H04L 1/20; H04B 1/715; H04B 1/713; H04B 1/7136; H04B 1/7143; H04B 1/7152; H04B 1/7154; H04B 2201/713; H04W 72/02; G09B 21/009
USPC ......................... 375/132, 133, 135, 136, 137
See application file for complete search history.

(56) References Cited

U.S. PATENT DOCUMENTS

| | | | |
|---|---|---|---|
| 6,351,643 B1 * | 2/2002 | Haartsen | H04W 72/082 455/444 |
| 7,529,288 B2 | 5/2009 | Felbecker et al. | |
| 7,684,464 B2 | 3/2010 | Linsky et al. | |

(Continued)

FOREIGN PATENT DOCUMENTS

| | | |
|---|---|---|
| WO | 2010/078435 A2 | 7/2010 |
| WO | 2012/002978 A1 | 1/2012 |

*Primary Examiner* — Siu Lee
(74) *Attorney, Agent, or Firm* — David S. Safran

(57) ABSTRACT

A system for providing sound to at least one user, with at least one audio signal source, a digital transmission unit applying a digital modulation scheme to transmit an audio signal via a wireless digital audio link; at least one receiver unit for receiving audio signals from the transmission unit, and an arrangement for stimulating the hearing of the user(s), the transmission unit transmitting each audio data packet according to an adaptive frequency hopping scheme and has a channel traffic detection unit for measuring the power in each channel of a monitored channel set and providing a channel traffic value for each channel based on the measured power, an interference detection unit for analyzing and deciding whether static interference is present, and determining the channel corresponding to the peak channel traffic, and a channel blanking unit for temporarily removing at least the channel corresponding to the peak channel.

27 Claims, 8 Drawing Sheets

(56) References Cited

U.S. PATENT DOCUMENTS

| | | |
|---|---|---|
| 7,995,687 B2 | 8/2011 | Desai et al. |
| 8,150,057 B2 | 4/2012 | Dunn |
| 8,218,487 B2 | 7/2012 | Eliezer et al. |
| 8,284,817 B2 | 10/2012 | Husted et al. |
| 8,428,101 B1* | 4/2013 | Sarca .................. H04B 1/713 370/330 |
| 9,094,357 B2* | 7/2015 | Tu ....................... H04L 51/30 |
| 9,136,902 B2 | 9/2015 | Chang et al. |
| 2005/0220135 A1* | 10/2005 | Honda ................ H04B 1/7143 370/437 |
| 2006/0098715 A1* | 5/2006 | Amano ................ H04B 1/715 375/132 |
| 2006/0133543 A1* | 6/2006 | Linsky ................ H04B 1/715 375/341 |
| 2008/0219323 A1 | 9/2008 | Desai et al. |
| 2012/0076173 A1 | 3/2012 | Chang et al. |

* cited by examiner

WIRELESS SOUND TRANSMISSION SYSTEM AND METHOD

BACKGROUND OF THE INVENTION

Field of the Invention

The invention relates to a system and a method for providing sound to at least one user, wherein audio signals from an audio signal source, such as a microphone for capturing a speaker's voice, are transmitted via a wireless link to a receiver unit, such as an audio receiver for a hearing aid, from where the audio signals are supplied to means for stimulating the hearing of the user, such as a hearing aid loudspeaker.

Description of Related Art

Typically, wireless microphones are used by teachers teaching hearing impaired persons in a classroom (wherein the audio signals captured by the wireless microphone of the teacher are transmitted to a plurality of receiver units worn by the hearing impaired persons listening to the teacher) or in cases where several persons are speaking to a hearing impaired person (for example, in a professional meeting, wherein each speaker is provided with a wireless microphone and with the receiver units of the hearing impaired person receiving audio signals from all wireless microphones). Another example is audio tour guiding, wherein the guide uses a wireless microphone.

Another application of wireless audio systems is the case in which the transmission unit is designed as an assistive listening device. In this case, the transmission unit may include a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

International Patent Application Publication WO 2010/078435 A2 and corresponding U.S. Pat. No. 8,150,057 relate to a communication system comprising a plurality of transmission units having a microphone for capturing the respective speaker's voice and transmitting audio signal data packets to a receiver unit which may be connected to an earphone or to a hearing aid via a plug jack. The transmission units and the receiver unit form a wireless network using a pseudo random sequence frequency hopping scheme and having a master-slave architecture, wherein certain slots in each frame are individually attributed to each of the transmission units, so that each transmission unit is allowed to transmit audio signals in its dedicated slots and receive audio signals transmitted in the remaining slots. Synchronization information data may be transmitted by the master in a certain slot of the frame. Each audio data packet is redundantly transmitted three times in three dedicated slots, with the receiver unit only listening until a correct copy of the audio data packet has been received, so that, when already the first copy is correctly received, the receiver unit would not listen to the redundant copies.

Interference between wireless devices operating the same band, such as the 2.4 GHz ISM band, may be a problem. In general, wireless devices may act as frequency static interferers using always the same frequencies for packet transmission (such WiFi devices) or as frequency hopping interferes using different transmission channels selected randomly from a list of transmission channels (such as Bluetooth devices). In adaptive frequency hopping (AFH), such channel list is regularly updated by removing interfering channels in order to minimize interference and by eventually re-inserting removed channel again once they are no longer interfering.

International Patent Application Publication WO 2012/002978 A1 and corresponding U.S. Pat. No. 8,284,817 relate to a wireless headset for mobile phones using an AFH algorithm, wherein broadband interferers are detected by determining an RSSI (received signal strength indicator) not only on the frequency where a packet is to be received but also on one or more neighboring frequencies/channels.

U.S. Pat. No. 7,995,687 B2 relates to a Bluetooth network using an AFH algorithm, wherein an RSSI is measured, optionally together with a bit error rate of the received packets.

U.S. Pat. No. 7,684,464 B2 likewise relates to a Bluetooth network using an AFH algorithm, wherein the channel metrics, as determined from RSSI and packet error rate measurements, is filtered in order to remove channel metric indicative of frequency hopping interference, so that only channel metrics indicative of frequency static interference remain. The RSSI is compared to threshold values. The filtering includes the formation of channel blocks.

U.S. Pat. No. 8,218,487 B2 relates to Bluetooth network using an AFH algorithm, wherein both an RSSI and a bit error rate are used for channel classification.

U.S. Pat. No. 7,529,288 B2 relates to a Bluetooth network using an AFH algorithm, wherein data packet error rates and/or bit error rates are used for channel classification.

U.S. Patent Application Publication 2012/0076173 A1 corresponds to U.S. Pat. No. 9,136,902 B2 relates to a Bluetooth network using an AFH algorithm, wherein a power spectral density is determined and compared to a fixed threshold for channel classification.

SUMMARY OF THE INVENTION

It is an object of the invention to provide for a wireless sound transmission system and method using frequency hopping, wherein the interference with static interferers should be minimized.

According to the invention, this object is achieved by a system and a method as described herein.

The invention is beneficial in that, with the analysis of the measured channel traffic values including a comparison between a maximum value and an average value, both derived from the measured channel traffic values, a particularly high reliability with regard to the distinction between frequency hopping interferers and static interferers can be achieved, so that the interference contributions of frequency hopping interferers can be easily filtered out. In the absence of frequency hopping interferers, such as when the only source of interference is a WiFi system, the comparison between a maximum value and an average value also provides a particular high reliability with regard to the detection of a static interferers even if the traffic generated by the static interference is low.

Hereinafter, examples of the invention will be illustrated by reference to the accompanying drawings.

DETAILED DESCRIPTION OF THE INVENTION

Figure 1:
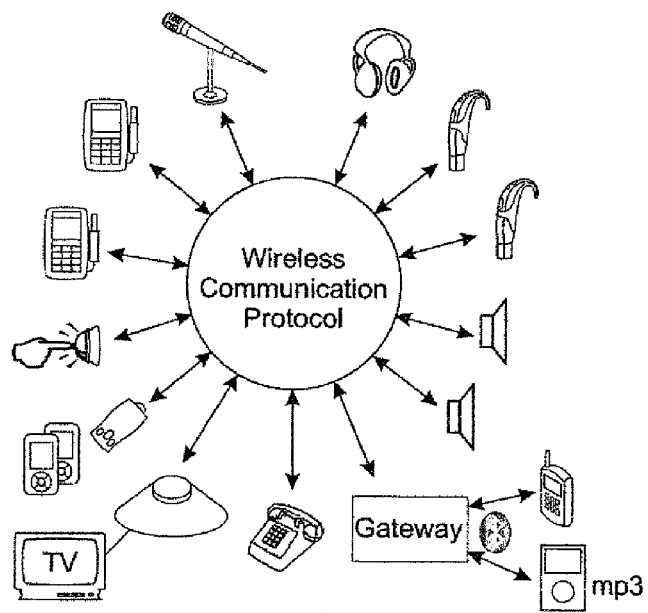
FIG. 1 is a schematic view of audio components which can be used with a system according to the invention.

As shown in FIG. 1, the device used on the transmission side of a system according to the invention may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player; etc. The transmission devices include body-worn devices as well as fixed devices. The devices on the receiver side include headphones, all kinds of hearing aids, ear pieces, such as for prompting devices in studio applications or for covert communication systems, and loudspeaker systems, such as audience loudspeaker systems. The receiver devices may be for hearing-impaired persons or for normal-hearing persons. Also on the receiver side a gateway could be used which relays audio signal received via a digital link to another device comprising the stimulation means.

The system may include a plurality of devices on the transmission side and a plurality of devices on the receiver side, for implementing a network architecture, usually in a master-slave topology.

The transmission unit typically comprises or is connected to a microphone for capturing audio signals, which is typically worn by a user, with the voice of the user being transmitted via the wireless audio link to the receiver unit.

The receiver unit typically is connected to a hearing aid via an audio shoe or is integrated within a hearing aid.

In addition to the audio signals, control data is transmitted bi-directionally between the transmission unit and the receiver unit. Such control data may include, for example, volume control or a query regarding the status of the receiver unit or the device connected to the receiver unit (for example, battery state and parameter settings).

Figure 2:
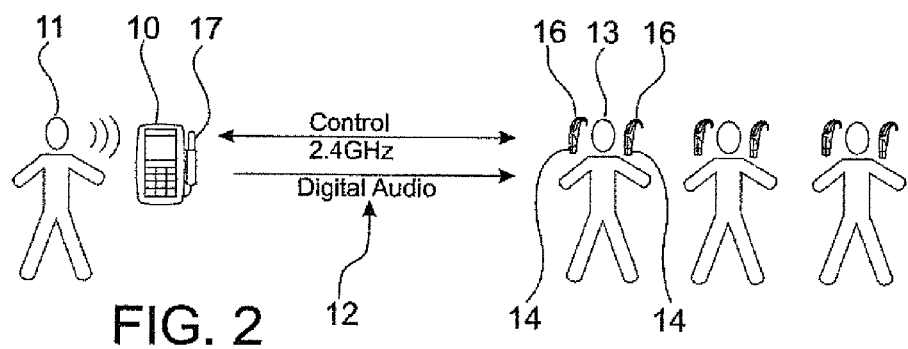
FIGS. 2 to 4 are schematic views of various examples of how a system according to the invention can be used.

In FIG. 2, a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e. the same signals are sent to all receiver units 14.

Figure 3:
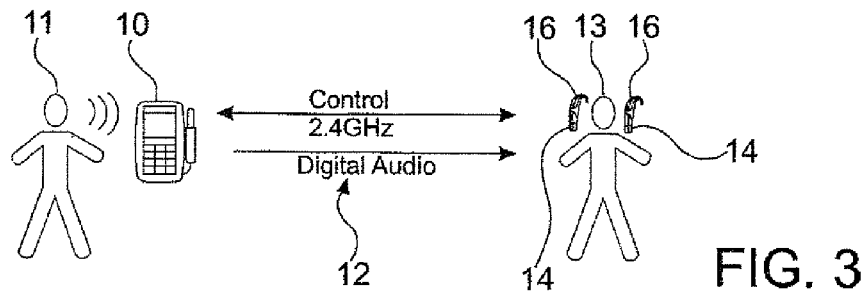

Another typical use case is shown in FIG. 3, wherein a transmission unit 10 having an integrated microphone is used by a hearing-impaired person 13 wearing receiver units 14 connected to or integrated within a hearing aid 16 for capturing the voice of a person 11 speaking to the person 13. The captured audio signals are transmitted via the digital link 12 to the receiver units 14.

Figure 4:
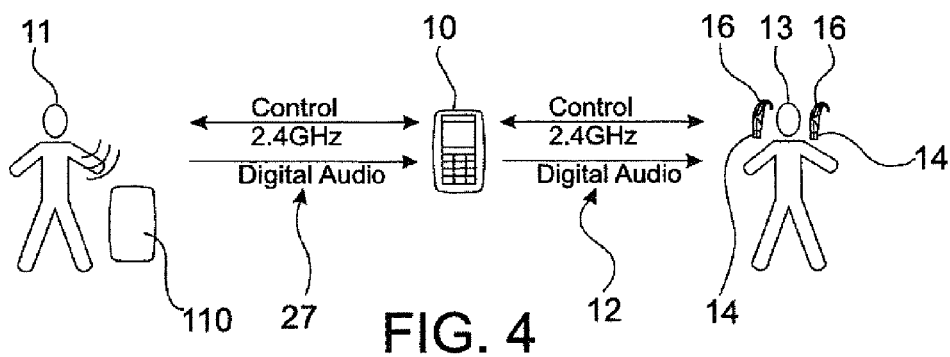

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4, the receiver units 14 could be designed as a neck-worn device comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source.

In each of such use cases the transmission unit 10 usually comprises an audio signal processing unit (not shown in FIGS. 2 to 4) for processing the audio signals captured by the microphone prior to being transmitted.

Figure 5:
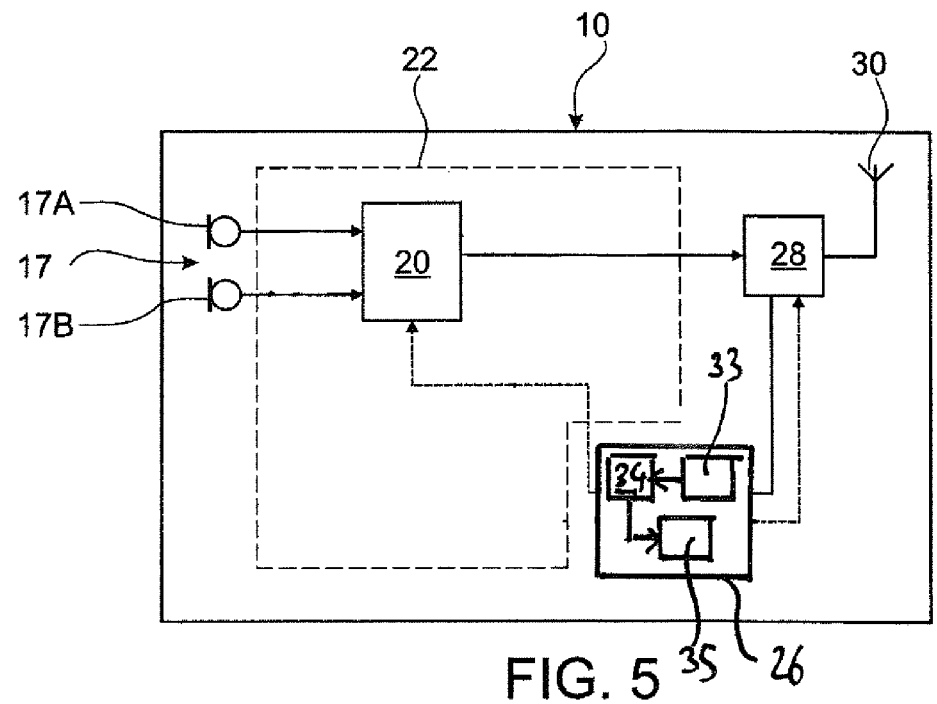
FIG. 5 is a block diagram of an example of a transmission unit to be used with the invention.

An example of a transmission unit 10 is shown in FIG. 5, which comprises a microphone arrangement 17 for capturing audio signals from the respective speaker's 11 voice, an audio signal processing unit 20 for processing the captured audio signals, a digital transmitter 28 and an antenna 30 for transmitting the processed audio signals as an audio stream composed of audio data packets. The audio signal processing unit 20 serves to compress the audio data using an appropriate audio codec. The compressed audio stream forms part of a digital audio link 12 established between the transmission units 10 and the receiver unit 14, which link also serves to exchange control data packets between the transmission unit 10 and the receiver unit 14. The transmission units 10 may include additional components, such as a voice activity detector (VAD). The audio signal processing unit 20 and such additional components may be implemented by a digital signal processor (DSP) indicated at 22.

In addition, the transmission units 10 also may comprise a microcontroller 26 acting on the DSP 22 and the transmitter 28. The microcontroller 26 may be omitted in case that the DSP 22 is able to take over the function of the microcontroller 26.

Preferably, the microphone arrangement 17 comprises at least two spaced-apart microphones 17A, 17B, the audio signals of which may be used in the audio signal processing unit 20 for acoustic beamforming in order to provide the microphone arrangement 17 with a directional characteristic.

According to one embodiment, the transmission units 10 may be adapted to be worn by the respective speaker 11 below the speaker's neck, for example, as a lapel microphone or as a shirt collar microphone.

Figure 6:
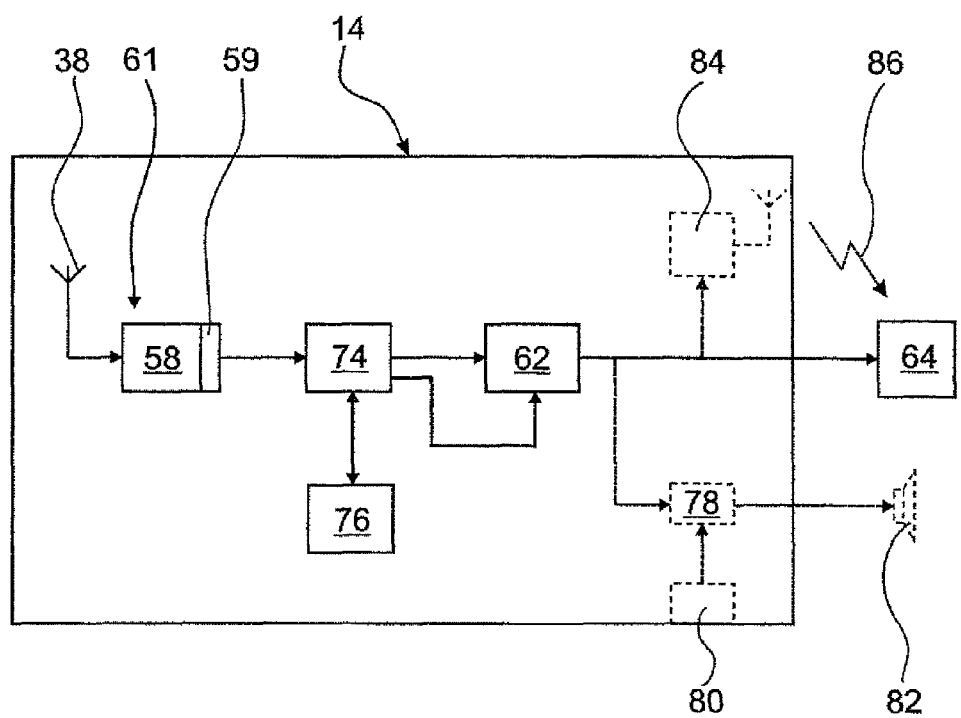
FIG. 6 is a block diagram of an example of a receiver unit to be used with the invention.

An example of a digital receiver unit 14 is shown in FIG. 6, according to which the antenna arrangement 38 is connected to a digital transceiver 61 including a demodulator 58 and a buffer 59. The signals transmitted via the digital link 12 are received by the antenna 38 and are demodulated in the digital radio receivers 61. The demodulated signals are supplied via the buffer 59 to a DSP 74 acting as processing unit which separates the signals into the audio signals and the control data and which is provided for advanced processing, e.g., equalization, of the audio signals according to the information provided by the control data. The processed audio signals, after digital-to-analog conversion, are supplied to a variable gain amplifier 62 which serves to amplify the audio signals by applying a gain controlled by the control data received via the digital link 12. The amplified audio signals are supplied to a hearing aid 64. The receiver unit 14 also includes a memory 76 for the DSP 74.

Rather than supplying the audio signals amplified by the variable gain amplifier 62 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be done remotely from the transmission unit 10 by transmitting corresponding control commands to the receiver unit 14.

Another alternative implementation of the receiver maybe a neck-worn device having a transmitter 84 for transmitting the received signals via with an magnetic induction link 86 (analog or digital) to the hearing aid 64 (as indicated by dotted lines in FIG. 6).

Figure 7:
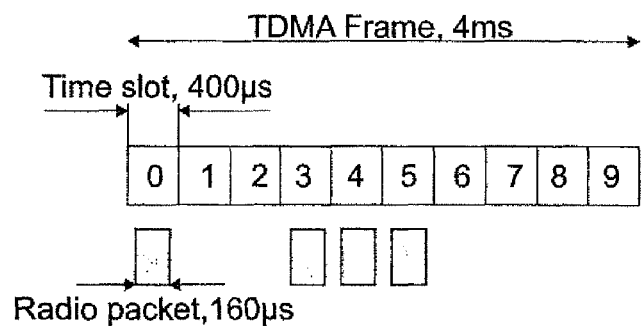
FIG. 7 is an example of a TDMA frame structure of the digital link of the invention.
Figure 8:
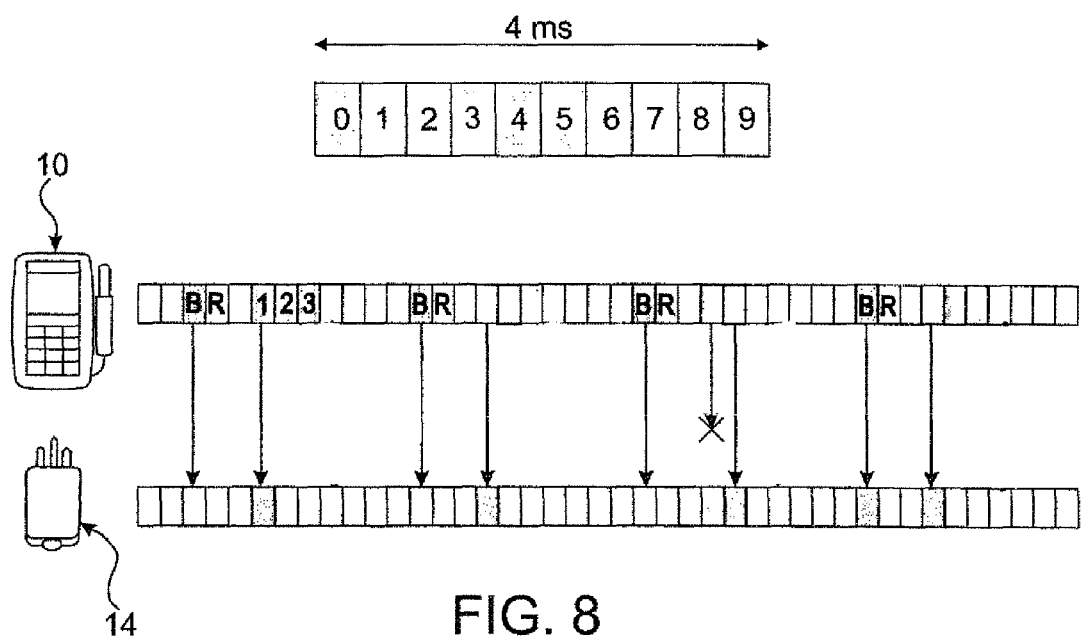
FIG. 8 is an illustration of an example of the protocol of the digital link used in a system according to the invention.

Some details of an example of the protocol of the digital link 12 will be discussed by reference to FIGS. 7 and 8. Typical carrier frequencies for the digital link 12 are 865 MHz, 915 MHz and 2.45 GHz, wherein the latter band is preferred. Examples of the digital modulation scheme are PSK/FSK, ASK or combined amplitude and phase modulations such as QPSK, and variations thereof (for example, GFSK).

Data transmission may occur in the form of TDMA (Time Division Multiple Access) frames comprising a plurality (for example, 10) of time slots, wherein in each slot one data packet may be transmitted. In FIG. 7 an example is shown wherein the TDMA frame has a length of 4 ms and is divided into 10 time slots of 400 μs, with each data packet having a length of 160 μs.

Alternatively, other time division schemes may be used, such as a time division duplex (TDD) (used for example, in the Bluetooth Classic protocol), where one slot is reserved for communication between a master and a slave, and the following slot is reserved for communication from the slave to the master.

Preferably, a slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), a constant odd number defining the hopping sequence (hopping sequence ID) and the frequency of the last slot of the previous frame.

The first slot of each TDMA frame (slot 0 in FIG. 7) may be allocated to the periodic transmission of a beacon packet which contains the sequence number numbering the TDMA frame and other data necessary for synchronizing the network, such as the list of good channels to be used in the adaptive frequency hopping sequence, such as information relevant for the audio stream, such as description of the encoding format, description of the audio content, gain parameter, surrounding noise level, etc., information relevant for multi-talker network operation, and optionally control data for all or a specific one of the receiver units.

The second slot (slot 1 in FIG. 7) may be allocated to the reception of response data from slave devices (usually the receiver units) of the network, whereby the slave devices can respond to requests from the master device through the beacon packet. At least some of the other slots are allocated to the transmission of audio data, wherein each audio data packet is repeated at least once, typically in subsequent slots. In the example shown in FIGS. 7 and 8 slots 3, 4 and 5 are used for three-fold transmission of a single audio data packet. The master device does not expect any acknowledgement from the slaves devices (receiver units), i.e. repetition of the audio data packets is done in any case, irrespective of whether the receiver unit has correctly received the first audio data packet (which, in the example of FIGS. 7 and 8, is transmitted in slot 3) or not. Also, the receiver units are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot, for example, slot 0.

The audio data is compressed in the transmission unit 10 prior to being transmitted.

Each audio data packet comprises a start frame delimiter (SFD), audio data and a frame check sequence, such as CRC (Cyclic Redundancy Check) bits. Preferably, the start frame delimiter is a 5 bytes code built from the 4 byte network ID provided by the network master during pairing. This 5 byte code is called the network address, being unique for each network.

In order to save power, the receivers 61 in the receiver unit 14 are operated in a duty cycling mode, wherein each receiver wakes up shortly before the expected arrival of an audio data packet. If the receiver is able to verify the correct reception of the audio data packet (by using the CRC at the end of the audio data packet), the receiver goes to sleep until shortly before the expected arrival of a new audio data packet (the receiver sleeps during the repetitions of the same audio data packet), which, in the example of FIGS. 7 and 8, would be the first audio data packet in the next frame. If the receiver determines, by using the CRC, that the audio data packet has not been correctly received, the receiver switches to the next frequency in the hopping sequence and waits for the repetition of the same audio data packet (in the example of FIGS. 7 and 8, the receiver then would listen to slot 4 as shown in FIG. 8, wherein in the third frame transmission of the packet in slot 3 fails).

In order to further reduce power consumption of the receiver, the receiver goes to sleep already shortly after the expected end of the SFD, if the receiver determines, from the missing SFD, that the packet is missing or has been lost. The receiver then will wake up again shortly before the expected arrival of the next audio data packet (i.e. the copy/repetition of the missing packet).

According to the invention, an AFH algorithm is used in order to minimize interference caused by the frequency hopping of a wireless audio system of the invention with regard to frequency static interfering devices operating in the same frequency band as the system of the invention. Examples of such devices are WiFi (or WLAN) network devices. In other words, the system seeks to avoid transmission in channels which interfere with the static frequency range used by the WiFi devices within the transmission area of the system.

To this end it is necessary to distinguish between other frequency hopping devices present within the transmission range of the system and static interferers. Once the interfering channels have been identified, they are removed from the list of channels used by the frequency hopping algorithm of the system.

As a first step, the power in each channel of a monitored channel set consisting of at least a part of channels of the frequency hopping channel set is measured at the transmission unit 10 for providing a channel traffic value for each of the monitored channels based on the measured power, with the channel traffic values forming a metric vector. The monitored channel set may include all channels potentially used by the frequency hopping algorithm; alternatively or, for practical reasons, some of the channels may be excluded from being monitored, namely channels in which there is significantly more traffic than in the other channels for certain reasons.

Such a channel sensing algorithm may be run as a background process in parallel to the TDMA protocol described above. For example, one of the channels may be measured in each TDMA frame during times when there is no packet transmission or reception activity in the TDMA network. With a TDMA period of 4 ms, one of the channels would be measured every 4 ms. Preferably, the channels would be measured subsequently one by one over the monitored channel set. For example, one would start with channel one and then continue with channel 2, etc., until the last channel (for example channel 40) is reached. It is to be noted that the channel measurement time may be randomized within the TDMA frame so that it cannot be always synchronous to another interference source having the same period of the TDMA frame. Rather than performing measurement of one channel in each TDMA frame, one channel may be measured only every n-th TDMA frame, such as every $5^{th}$ or every $10^{th}$ TDMA frame.

Alternatively, instead of selecting the channels, subsequently, one by one over the monitoring channel set, the channels may be selected randomly.

Preferably, each power measurement consists of determining whether the power in respective channel is above a given interference threshold or not: if the power is above the threshold, the result of the measurement is a Boolean "1", and if the power is at or below the threshold, the measurement result is a "0".

The channel traffic value for each monitored channel preferably is determined from a moving average of several subsequent measurements of the same channel. For example, the moving average may be an exponential moving average, so that the most recent measurement of each channel contributes to the present channel traffic value with the highest weight, with the weight decreasing exponentially with the distance in time from the most recent measurement.

According to the example of FIG. 5, the channel sensing algorithm may be implemented in the microcontroller 26 via a channel traffic detection unit 33 which cooperates with the transceiver 28 of the transmission unit 10.

Figure 13:
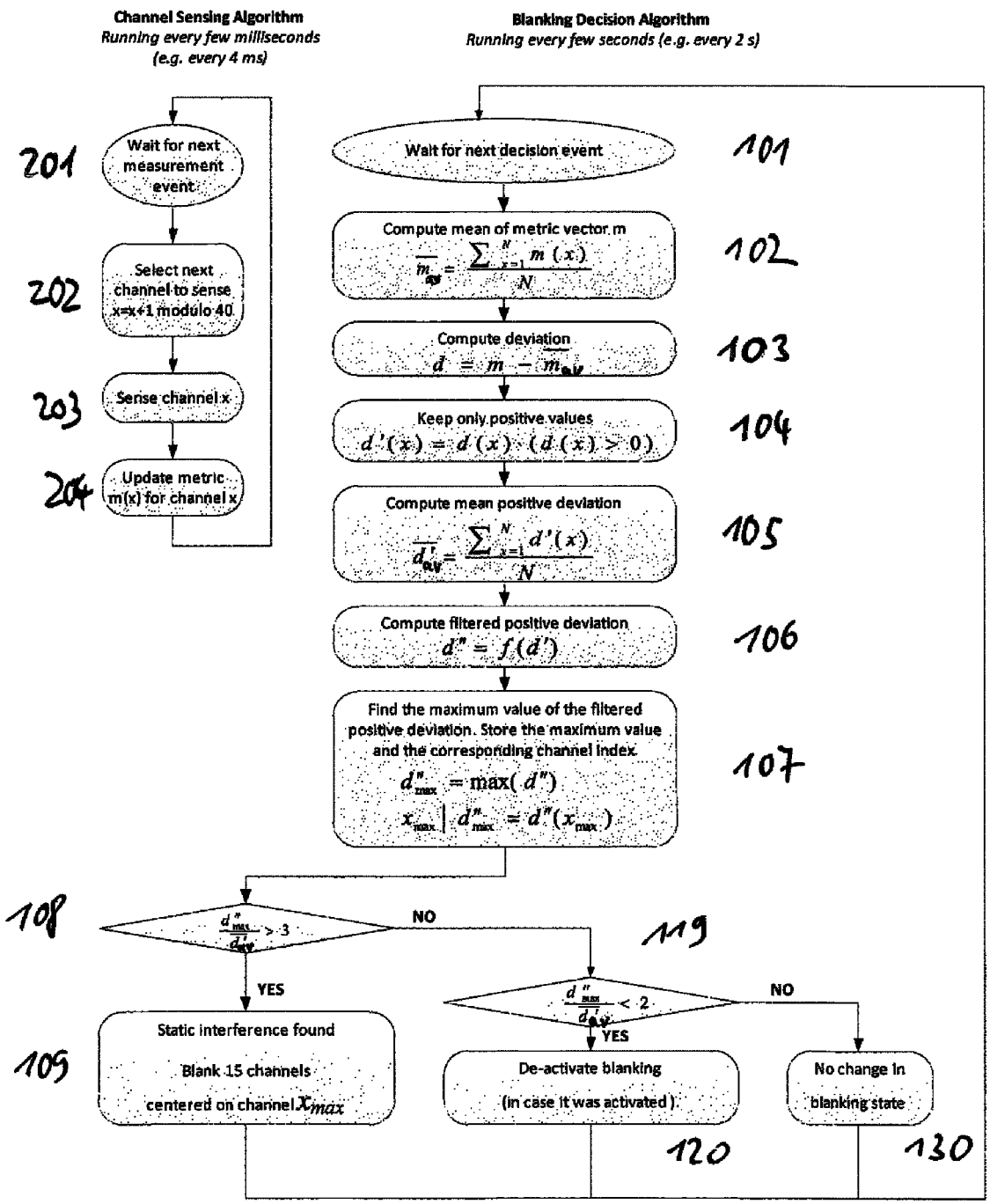
FIG. 13 is a flowchart of an example of a channel sensing algorithm (left-hand side) and of an example a blanking decision algorithm (right-hand side) to be used with the invention.

An example of such channel sensing algorithm is shown in FIG. 13 (left hand-side), according to which in step 201 controller 26 waits for the next measurement event, in step 202 it selects the next channel to be measured as x=x+1 modulo 40 (since the number N of channels in the example is 40), in step 203 the selected channel x is measured once (i.e. it is determined whether the power is above the interference threshold or not) and in step 204 it updates the metric m(x) for the channel x (i.e., it updates the channel traffic value), with this frequency being repeated for the next channel etc.

Figure 14:
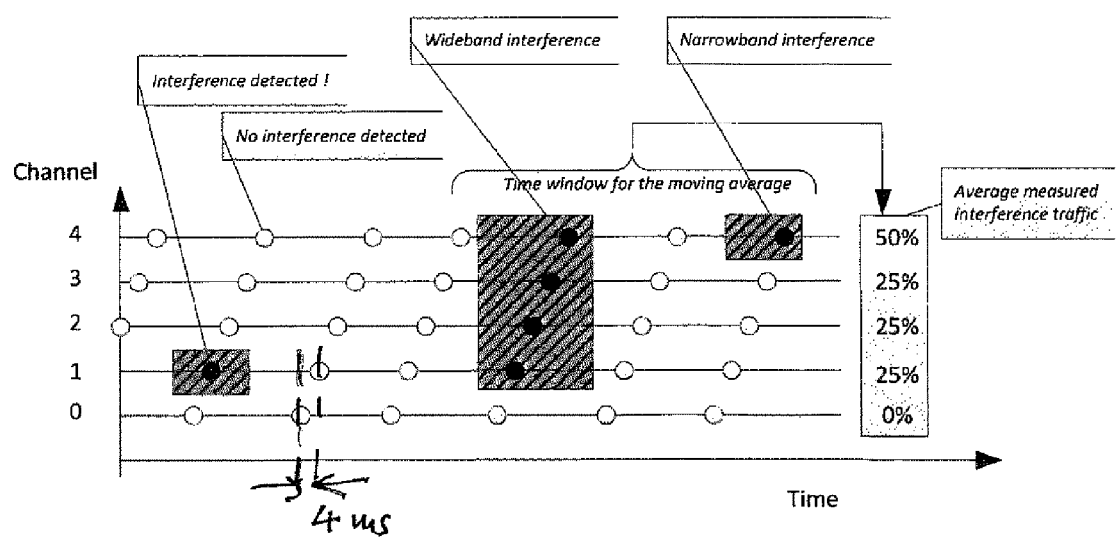
FIG. 14 is a schematic illustration of a practical application of a channel sensing algorithm to be used with the invention.

A schematic example of a practical application of such channel sensing algorithm is shown in FIG. 14 for 5 channels 0, 1, 2, 3 and 4, with the power measurement events and results being shown over time, with a full circle denoting a measured power above the interference threshold and an open circle denoting a measured power at or below the threshold. The interval between two measurements typically is about 4 ms, corresponding to the TDMA frame. In the example of FIG. 14, the time window taken for the moving average includes 4 subsequent measurements of the same channel. According to the example of FIG. 14, the present channel traffic value obtained by the moving average of the last 4 measurements would be 50%, 25%, 25% and 0% respectively, for the channels 4, 3, 2, 1 and 0 (these values would form the components of the metric vector of the channel traffic). In FIG. 14, an example of a narrow band interference effecting only one channel and an example of a wide band interference effecting several channels is shown schematically.

According to one example, an exponential moving average may be implemented by the formula $$R = 1/a * M + (1 - 1/a) * R,$$

wherein R is a value between 0 and 1 and represents the moving average of the channel traffic value, and M is the present measurement result which is either 0 (in case that the power is at or below the threshold) or 1 (in case that the power is above the threshold). In order to implement this algorithm in a CPU, it may be converted into an integer algorithm, wherein r is R*8192, i.e. a value between 0 and 8192, resulting in $$r = 64 * R + (127 * r)/128.$$

Also other examples of a moving average are conceivable, such as a simple uniform weighting of, e.g., the last 5 or 10 measurements.

Using a moving average in order to determine the percentage of time that the power is above a threshold has the benefit that it can be implemented in a simple way without storing the results of several measurements of the same channel. However, alternatively, it would also be possible to store a certain number of the last measurements for each channel and then calculate a classical average.

According to another approach, rather than obtaining according to the above approach the percentage of time that the power is above a fixed threshold ("percentage of traffic"), one may weight this metric with the power actually present at the time of the measurement. For example, the metric could be weighted with a RSSI value.

In order to detect interference with a static interferer the metric vector is analyzed in order to decide whether a static interference is present and, if so, to determine the channel corresponding to the peak channel traffic, with the analysis of the metric vector including a comparison between a maximum value derived from the channel traffic values of the metric vector and an average value derived from the channel traffic values of the metric vector.

In the example of FIG. 5, such interference detection may be implemented in the microcontroller 26 via an interference detection unit 34.

Based on the decision that a static interference is present, the channel corresponding to peak channel traffic and a number of channels around that channel then are temporarily removed from the list of transmission channels in a "blanking" step in order to avoid interference of transmission unit 10 with the static interference device (for example, a WiFi device). In the example of FIG. 5, such a blanking step may be implemented in the microcontroller via a blanking unit 35.

In the blanking step, the channels to be removed from the channel list may be removed, for example, subsequently one-by-one during a given blanking time period, which may be for example, at least one second, in order to provide enough time to the receiver units to adapt to the changing frequency map, since removing too many channels at the same time from the list would cause a too high packet error rate on the receiver units for a short period until the next beacon is received to refresh the channel map on the receiver units. Alternatively, rather removing the channels one-by-one, the channels may be removed in subsequent blocks of, for example, two or three channels.

Typically, each channel may have a width of between 1 MHz and 5 MHz; preferably each channel has a width of 2.0 MHz.

Typically, at least 5, preferably at least 7, channels on each side of the peak traffic channel are removed from the list. With a WiFi channel typically having a width of 20 MHz, removing 15 channels of 2 MHz width would free 30 MHz centered on the WiFi channel, thus allowing additional 5 MHz to be free on each side of the WiFi channel, which is useful in case of centering errors and for allowing a larger frequency distance for a better signal rejection.

Depending on the standard which the frequency hopping used by the system has to comply with (for example, according to certain standards, 15 or 20 channels may be sufficient for the frequency hopping algorithm), additional (e.g., 5 or 10) channels could be removed individually based on other criteria, such as if the amount of traffic being above a fixed threshold as measured by the transmission unit or such as if the packet error rate measured by the receiver unit is above a fixed threshold.

The analysis of the metric vector and the decision concerning the presence of a static interference is carried out on a regular basis, such as in repetition intervals of a duration of, for example, 0.1 to 60 sec.

Figure 9:
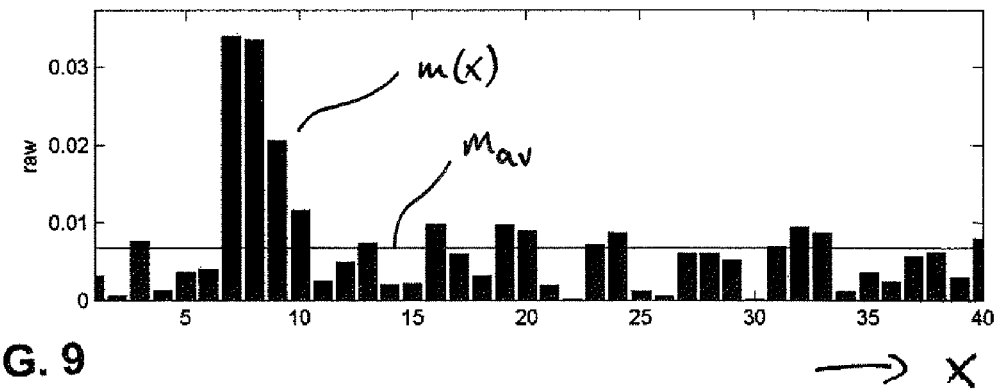
FIG. 9 shows an example of the measured percentage of traffic in each transmission channel of a set of 40 channels to be used by a system according to the invention, when both a static interferer and a frequency hopping interferer are present.

An example of the metric vector of the channel traffic values in the presence of a single WiFi interferer is shown in FIG. 9; according to this example, there is a strong interference around channel #8.

Figure 10:
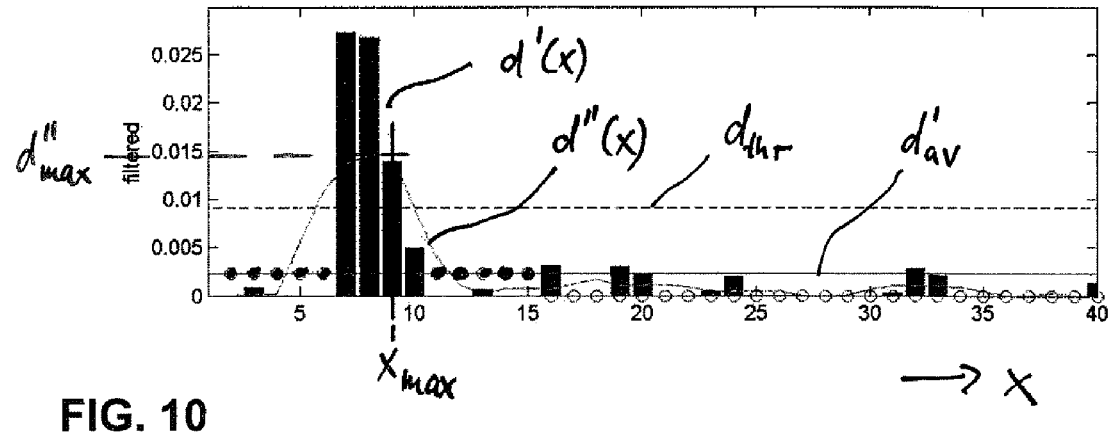
FIG. 10 shows an example of the positive deviation of the percentage of traffic of FIG. 9 from the average of all channels before (columns) and after filtering with a 7 channel filter (solid line)

According to the example of a blanking decision algorithm shown in FIG. 13 (right-hand side), in step 102 an average value of the channel traffic values of the metric vector m is calculated (the average value is indicated by the horizontal line labeled "$m_{av}$" in FIG. 9), and in step 103 for each channel the average value is subtracted from the channel traffic value in order to keep the resulting difference as a "deviation channel traffic value" d' if the difference is positive, while the deviation channel traffic value d' is set to 0 if the difference is negative. The resulting deviation channel traffic values d'(x) are shown in FIG. 10 as columns (cf. also step 104 of FIG. 13).

In step 105, the average positive deviation is calculated by averaging all channels (the average deviation is indicated by the horizontal line labeled "$d'_{av}$" in FIG. 10), which value is later used for the decision whether a frequency static interference is present or not.

In step 106, a filtered positive deviation d"(x) is calculated for each channel from the positive deviation d' as a weighted average of the deviation channel traffic value of the respective channel and at least two of the channels adjacent to that channel (for example, at least two, preferably three, of the channels adjacent to the respective channel on each side may be taken into account for this weighted average). An example of such filtered deviation channel traffic values is indicated by the curve labeled d"(x) in FIG. 10. By such filtering, a "smoother" curve is obtained which allows to locate the center of a wideband interferer more precisely.

In step 107, the maximum value $d''_{max}$ of the filtered positive deviation and the channel index $x_{max}$ of the respective channel having the maximum filtered deviation value are stored.

In step 108, the maximum filtered positive deviation value $d''_{max}$ is compared to the average of the positive deviation $d'_{av}$ in order to decide whether a frequency static interference is present or not.

In the example of FIG. 13, the criterion of the decision is whether the maximum value of the deviation is larger than three times the average deviation (this threshold value is indicated by the dashed horizontal line labeled $d_{thr}$); preferably, this blanking enabling threshold value $d_{thr}$ may be between 2 and 4 times the average $d'_{av}$ of the deviation. In case that the decision in step 108 is "YES", it is decided that a static interference is found and the blanking procedure is started, wherein a number of channels, for example 15 channels, centered on the channel $x_{max}$ having the maximum value $d''_{max}$ of the filtered deviation are removed from the list of channels to be used in the frequency hopping algorithm.

In case that the decision in step 108 is "NO", it is decided in step 119 whether the maximum filtered positive deviation $d''_{max}$ is above or below a blanking disabling threshold, which may be defined, for example, by twice the average $d'_{av}$ of the deviation (preferably the blanking disabling threshold value may be between 1 and 3 times the average of the deviation). In case that it is found in step 119 that the maximum value of the filtered deviation is at or below the blanking disabling threshold, a previous blanking action (if present) is reversed by reinserting the blanked channels into the list of the frequency hopping channels (see step 120 in FIG. 13). In case that the maximum value $d''_{max}$ of the filtered deviation is found to be above the blanking disabling threshold in step 119, no change in the blanking state takes place (as indicated in step 130 in FIG. 13).

In FIG. 10, the blanked channels are indicated by full circles, whereas the non-blanked channels are indicated by open circles.

Generally, the blanking disabling threshold value is always smaller than the blanking enabling threshold value.

Preferably, the removed channels are reinserted into the list subsequently one by one. For example, the removed channels may be reinserted into the list in intervals of 0.5 to 10 sec between two subsequent channels.

Figure 11:
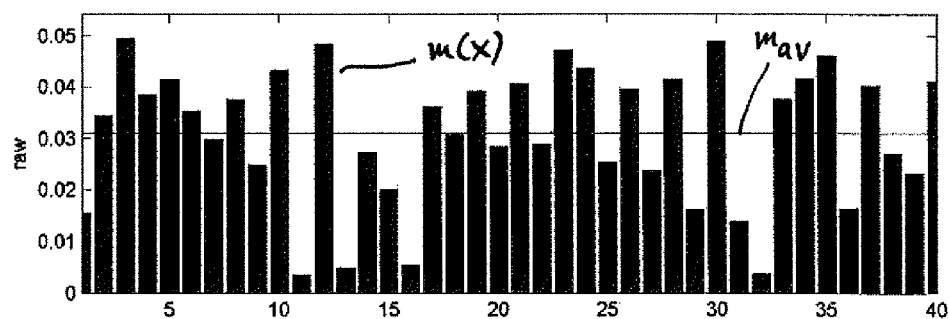
FIG. 11 shows a diagram like FIG. 9, wherein, however, several frequency hopping interferers are present, with no static interferer being present.
Figure 12:
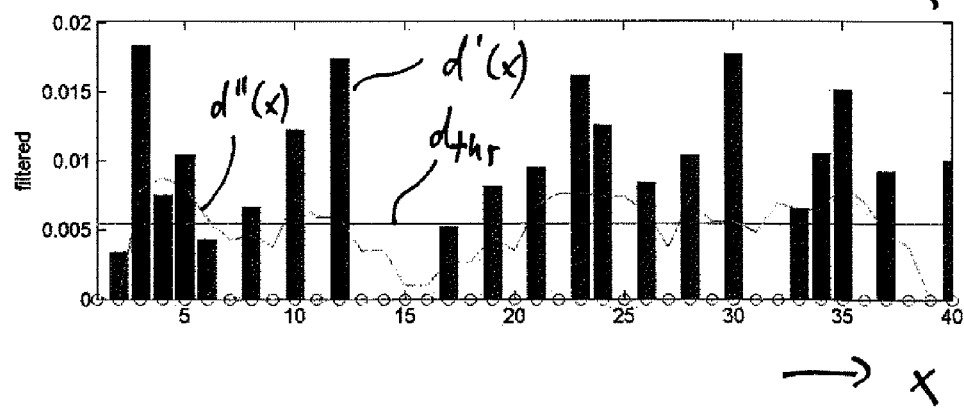
FIG. 12 shows a diagram like FIG. 10 for the example of FIG. 11.

In FIGS. 11 and 12, diagrams like that of FIGS. 9 and 10 are shown for an alternative example, wherein several frequency hopping devices are present, creating a random amount of interference on all channels, while, in contrast to the example of FIGS. 9 and 10, no static interference is present. The same algorithm is applied as in the example of FIGS. 9 and 10, and it can be seen that, in the case of FIGS. 11 and 12, it is decided that no static interference is present, so that no blanking is necessary; i.e., in step 108, the decision is "NO".

It is to be understood that the units 33, 34, and 35 formed by the microcontroller alternatively could be implemented by the DSP 22.

This invention may be useful in any adaptive frequency hopping system, being either a proprietary system or a standard system such as Bluetooth Classic or Bluetooth Low Energy.

What is claimed is:

1. A system for providing sound to at least one user (13), comprising:
   at least one audio signal source (17) for providing an audio signal;
   a transmission unit (10, 110) comprising a digital transmitter (28) for applying a digital modulation scheme in order to transmit the audio signal as audio data packets from the audio signal source via a wireless digital audio link (12);
   at least one receiver unit (14) for reception of audio signals from the transmission unit via the digital audio link, comprising at least one digital receiver (61); and
   means (16, 64, 82) for stimulating the hearing of the user(s) according to audio signals supplied from the receiver unit;
   wherein the transmission unit is adapted to transmit each audio data packet according to an adaptive frequency hopping scheme at a frequency selected randomly from a list of transmission channels which is selected from a given frequency hopping set of transmission channels and which is updated on a regular basis; and wherein the transmission unit comprises
   a channel traffic detection unit (26, 33) for measuring, on a regular basis, the power in each channel of a monitored channel set consisting of at least a part of the channels of said frequency hopping channel set at the transmission unit for providing a channel traffic value (m) for each of these channels based on the measured power, the channel traffic values forming a metric vector,
   an interference detection unit (26, 34) for analyzing, on a regular basis, the metric vector in order to decide whether a static interference is present and, if so, to determine the channel ($x_{max}$) corresponding to the peak channel traffic, with the analysis of the metric vector including a comparison between a maximum value ($d''_{max}$) derived from the channel traffic values and an average value ($d'_{av}$) derived from the channel traffic values; and
   a channel blanking unit (26, 35) for temporarily removing, if it is decided that a static interference is present, the channel corresponding to the peak channel traffic and a number of channels around said channel from the list of transmission channels.

2. The system of claim 1, wherein the interference detection unit (26, 34) is adapted to calculate an average value ($m_{av}$) of the channel traffic values (m) of the metric vector and to subtract said average value from each channel traffic value in order to obtain the difference as a deviation channel traffic value (d').

3. The system of claim 2, wherein the interference detection unit (26, 34) is adapted to obtain a filtered deviation channel traffic value (d") for each channel of the monitored channel set by calculating a weighted average of the deviation channel traffic values of the respective channel and at least one of the channels adjacent to said respective channel, to determine a maximum ($d''_{max}$) of the filtered deviation channel traffic values and an average of the deviation channel traffic values over all channels of the monitored channel set, and to decide that a static interference is present if the maximum of the filtered deviation channel traffic values is above a blanking enabling threshold value ($d_{thr}$) derived from said average of the deviation channel traffic values.

4. The system of claim 3, wherein the filtered deviation channel traffic value (d') is calculated for each channel by calculating a weighted average of the deviation channel traffic values of the respective channel and at least two, preferably three, of the channels adjacent to said respective channel on each side.

5. The system of claim 2, wherein the interference detection unit (26, 34) is adapted to obtain said difference as a deviation channel traffic value (d') only if said difference is positive and to set the deviation channel traffic value to zero if said difference is negative.

6. The system of claim 1, wherein the interference detection unit (26, 34) is adapted to decide whether a static interference is present in repetition intervals of a duration of 0.1 to 60 sec.

7. The system of claim 1, wherein the channel blanking unit (26, 35) is adapted to remove the respective channels from said list subsequently one channel by one channel or subsequently one block of channels by one block of channels over a given blanking time period.

8. The system of claim 7, wherein the blanking time period is at least one second.

9. The system of claim 1, wherein each channel has a width between 1 MHz and 5 MHz.

10. The system of claim 1, wherein the channel blanking unit (26, 35) is for removing the channel ($x_{max}$) corresponding to the peak channel traffic and at least 5 channels on each side of said channel from the list of transmission channels.

11. The system of claim 3, wherein the channel blanking unit (26, 35) is adapted to start to reinsert the removed channels into said list once it has been determined that the maximum ($d''_{max}$) of the filtered deviation channel traffic values is below a blanking disabling threshold value derived from said average ($d'_{av}$) of the deviation channel traffic values, with the blanking disabling threshold value being smaller than the blanking enabling threshold value ($d_{thr}$).

12. The system of claim 11, wherein the channel blanking unit (26, 35) is adapted to reinsert the removed channels into said list subsequently one-by-one.

13. The system of claim 12, wherein the channel blanking unit (26, 35) is adapted to reinsert the removed channels into said list in intervals of 0.5 to 10 sec between two subsequent channels.

14. The system of claim 3, wherein said blanking enabling threshold value is 2 to 4 times said average ($d'_{av}$) of the deviation channel traffic values.

15. The system of claim 11, wherein the said blanking disabling threshold value is 1 to 3 times said average ($d'_{av}$) of the deviation channel traffic values.

16. The system of claim 1, wherein the channel traffic detection unit (26, 33) is adapted to measure the channel power subsequently one-by-one for each of the channels of the monitored channel set according to a fixed or random order.

17. The system of claim 16, wherein the channel traffic detection unit (26, 33) is adapted to determine whether the power in the channel to be measured is above a given interference threshold, and wherein the channel traffic value (m) for that channel is determined from a moving average of several subsequent measurements of the same channel.

18. The system of claim 17, wherein the channel traffic detection unit (26, 33) is adapted to determine the channel traffic value (m) from an exponential moving average of several subsequent measurements of the same channel.

19. The system of claim 16, wherein the transmission unit (10, 110) is adapted to transmit the audio data packets according to a time division scheme, and wherein the channel traffic detection unit (26, 33) is adapted to measure the power in every monitored channel at least every 5 second in average, preferably every 160 milliseconds in average.

20. The system of claim 16, wherein the channel traffic detection unit (26, 33) is adapted to determine a RSSI for each channel to be measured.

21. The system of claim 1, wherein the transmission channels are located in the 2.4 GHz ISM band.

22. The system of claim 1, wherein the audio signal source is a microphone arrangement (17) integrated into or connected to the transmission unit (10) for capturing a speaker's voice.

23. The system of claim 1, wherein the transmission unit (10) is for being connected to or integrated into an audio device as the audio signal source.

24. The system of claim 1, wherein at least one of the receiver units (14) is connected to or integrated into an ear-worn device, such as a hearing aid (16, 64), comprising the stimulation means.

25. The system of claim 1, wherein at least one of the receiver unit is a neck-worn device comprising a transmitter (84) for transmitting audio signals via an inductive link to an ear-worn device, such as a hearing aid (64), comprising the stimulation means.

26. The system of claim 1, wherein the at least one receiver unit (14) is connected to or integrated within at least one audience loudspeaker serving as the stimulation means.

27. A method for providing sound to at least one user (13), comprising:

providing an audio signal from at least one audio signal source (17) to a transmission unit (10, 110) comprising a digital transmitter (28) for applying a digital modulation scheme;

transmitting the audio signal as audio data packets via a digital wireless audio link (12) from the transmission unit to at least one receiver unit (14) comprising at least one digital receiver (61); and stimulating the hearing of the user(s) according to the audio signal supplied from the receiver unit;

wherein each audio data packet is transmitted according to an adaptive frequency hopping scheme at a frequency selected randomly from a list of transmission channels which is selected from a given frequency hopping set of transmission channels and which is updated on a regular basis;

wherein, on a regular base, the power in each channel of a monitored channel set consisting of at least a part of the channels of said frequency hopping channel set is measured at the transmission unit and a channel traffic value (m) is provided for each of these channels based on the measured power, the channel traffic values forming a metric vector;

wherein, on a regular base, the metric vector is analyzed in order to decide whether a static interference is present and, if so, to determine the channel corresponding to the peak channel traffic, with the analysis of the metric vector including a comparison between a maximum value ($d''_{max}$) derived from the channel traffic values and an average value ($d'_{av}$) derived from the channel traffic values; and wherein, if it is decided that a static inference is present, the channel corresponding to the peak channel traffic and a number of channels around said channel are temporarily removed from said list.

\* \* \* \* \*